United States Patent
Nabeta (10) Patent No.: US 12,539,527 B2
(45) Date of Patent: Feb. 3, 2026

(54) HORN AND ULTRASONIC JOINER

(71) Applicant: Yazaki Corporation, Tokyo (JP)

(72) Inventor: Yasunori Nabeta, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/928,480

(22) Filed: Oct. 28, 2024

(65) Prior Publication Data

US 2025/0135494 A1  May 1, 2025

(30) Foreign Application Priority Data

Oct. 30, 2023  (JP) ................... 2023-185533

(51) Int. Cl.
| | |
|---|---|
| *B23K 20/00* | (2006.01) |
| *B06B 3/00* | (2006.01) |
| *B23K 20/10* | (2006.01) |
| *B23K 101/32* | (2006.01) |

(52) U.S. Cl.
CPC ............ *B06B 3/00* (2013.01); *B23K 20/106* (2013.01); *B06B 2201/72* (2013.01); *B23K 2101/32* (2018.08)

(58) Field of Classification Search
CPC .............. B06B 3/00; B06B 2201/72; B23K 20/10–106; B23K 2101/32; B29C 65/08
USPC .................... 228/1.1, 110.1; 156/73.1–73.6, 156/580.1–580.2
See application file for complete search history.

(56) References Cited

U.S. PATENT DOCUMENTS

| | | | | |
|---|---|---|---|---|
| 7,337,938 B2 * | 3/2008 | Noro | ................... | B29C 66/1122 228/1.1 |
| 2010/0242280 A1 * | 9/2010 | Adachi | ............... | F04D 29/2227 29/889.7 |
| 2011/0248069 A1 * | 10/2011 | Khakhalev | ........... | B23K 20/106 228/110.1 |
| 2015/0288123 A1 * | 10/2015 | Wagner | .................. | H01R 4/029 228/110.1 |
| 2020/0343518 A1 * | 10/2020 | Yamamoto | .......... | H01M 50/557 |
| 2021/0129453 A1 * | 5/2021 | Wang | ...................... | B29C 66/95 |
| 2022/0048129 A1 * | 2/2022 | Böhm | .................. | B23K 26/244 |
| 2025/0050445 A1 * | 2/2025 | Yang | ..................... | B23K 20/106 |
| 2025/0135494 A1 * | 5/2025 | Nabeta | .................. | B23K 20/106 |
| 2025/0153262 A1 * | 5/2025 | Baek | ..................... | B23K 20/10 |

FOREIGN PATENT DOCUMENTS

| | | | | | |
|---|---|---|---|---|---|
| CN | 101146640 | A | * | 3/2008 | ............ B23K 20/106 |
| CN | 109317813 | A | * | 2/2019 | ............ B23K 20/26 |
| CN | 111975189 | A | * | 11/2020 | ............ B29C 65/08 |
| CN | 114178670 | A | * | 3/2022 | ............ B23K 20/10 |
| CN | 118660778 | A | * | 9/2024 | ......... B29C 66/7392 |
| EP | 2113371 | A1 | * | 11/2009 | ....... B29C 66/83533 |

(Continued)

*Primary Examiner* — Kiley S Stoner
(74) *Attorney, Agent, or Firm* — Sughrue Mion, PLLC (57) ABSTRACT

A horn has knurl-shaped protrusions and recesses that are formed of a plurality of protrusions, and are formed on a first end surface. Among the plurality of protrusions, at least a pair of protrusions arranged symmetrically at both outermost ends in a direction along a vibration direction are asymmetrical surface protrusions. In each of the asymmetrical surface protrusions, an angle value of an outer inclination angle is smaller than an angle value of an inner inclination angle.

10 Claims, 6 Drawing Sheets

(56) References Cited

FOREIGN PATENT DOCUMENTS

| EP | 3626475 A2 | * | 3/2020 | ............. B42D 25/45 |
|----|------------|---|--------|--------------------------|
| JP | 03000494 A | * | 1/1991 | |
| JP | 09052185 A | * | 2/1997 | |
| JP | 2006165518 A | * | 6/2006 | ....... H01L 23/49562 |
| JP | 2006231402 A | * | 9/2006 | ....... B29C 66/81435 |
| JP | 2008-110382 A | | 5/2008 | |
| JP | 2008528299 A | * | 7/2008 | ........... B23K 20/106 |
| JP | 2014213366 A | * | 11/2014 | ............. B23K 20/10 |
| JP | 2016506303 A | * | 3/2016 | ............. H01R 4/029 |
| KR | 20240043107 A | * | 4/2024 | ............. B23K 26/21 |

\* cited by examiner

HORN AND ULTRASONIC JOINER

CROSS REFERENCE TO RELATED APPLICATION

The present application is based on, and claims priority from the Japanese Patent Application No. 2023-185533, filed on Oct. 30, 2023, the entire contents of which are incorporated herein by reference.

TECHNICAL FIELD

The disclosure relates to a horn and an ultrasonic joiner.

BACKGROUND

An ultrasonic joiner which applies ultrasonic vibration to a horn, while a plurality of objects to be joined are sandwiched between the horn and an anvil, in order to join the objects to be joined to each other, is conventionally known. JP 2008-110382 A discloses a technique relating to an ultrasonic joiner, in which a plurality of objects to be joined are assumed to be core wires of a plurality of electric wires, and at least one of end surfaces of a horn and an anvil facing each other has thereon, protrusions and recesses formed of a plurality of protrusions, each having a triangular cross-section, disposed in line with each other in an axial direction of the core wires. In general, vibration from the horn propagates between the plurality of objects to be joined while being damped, and reaches the anvil.

SUMMARY OF THE INVENTION

In the ultrasonic joiner disclosed in JP 2008-110382 A, due to the plurality of protrusions being caught on the objects to be joined during a joining operation, the vibration from the horn is transmitted to the objects to be joined. However, the cross-sectional shape of all of the protrusions included in the protrusions and recesses is set to be an isosceles triangle, which is linear symmetrical with respect to the vertex of the triangle. Therefore, depending on the choice of a vertex angle of each protrusion, an angle of the reaction force applied to the objects to be joined relative to a vibration direction of the horn becomes large. In this case, a vibration direction component of the reaction force applied to the objects to be joined becomes small, and the force for pressing the objects to be joined in the vibration direction is dispersed, when the horn vibrates. Therefore, when the number of objects to be joined is large, damping of vibration may not be suppressed, and the joining between the objects to be joined may be weakened, for example.

An object of the present disclosure is to provide a horn and an ultrasonic joiner which are advantageous for suppressing damping of ultrasonic vibration propagating through a plurality of objects to be joined.

A first aspect of embodiments provides a horn that applies ultrasonic vibration to a plurality of objects to be joined sandwiched between an anvil and the horn, to join the objects to be joined to each other, the horn including: knurl-shaped protrusions and recesses that are formed of a plurality of protrusions each extending in a width direction perpendicular to a vibration direction of the horn, and that are formed on an end surface in contact with one of the objects to be joined, in which among the plurality of protrusions, at least a pair of protrusions arranged symmetrically at both outermost ends in a direction along the vibration direction are asymmetrical surface protrusions, a cross-sectional shape perpendicular to a width direction of each of the asymmetrical surface protrusions is a triangle having a top of each of the asymmetrical surface protrusions as a vertex, among two side surfaces of each of the asymmetrical surface protrusions, an inclination angle of one of the two side surfaces inclined toward an outer side of the protrusions and recesses is defined as an outer inclination angle, and an inclination angle of the other of the two side surfaces inclined toward an inner side of the protrusions and recesses is defined as an inner inclination angle, and an angle value of the outer inclination angle is smaller than an angle value of the inner inclination angle.

A second aspect of embodiments provides an ultrasonic joiner that applies ultrasonic vibration to a plurality of objects to be joined sandwiched between a horn and an anvil from the horn, to join the plurality of objects to be joined to each other, in which the horn is the horn according to the first aspect.

According to the above configurations, it is possible to provide a horn and an ultrasonic joiner which are advantageous for suppressing damping of ultrasonic vibration propagating a plurality of objects to be joined.

DETAILED DESCRIPTION OF THE INVENTION

A horn and an ultrasonic joiner including the horn according to each embodiment will be described in detail below with reference to the drawings. The dimensional ratios of the drawings are exaggerated for convenience of explanation and may differ from the actual ratios.

First Embodiment

Figure 1:
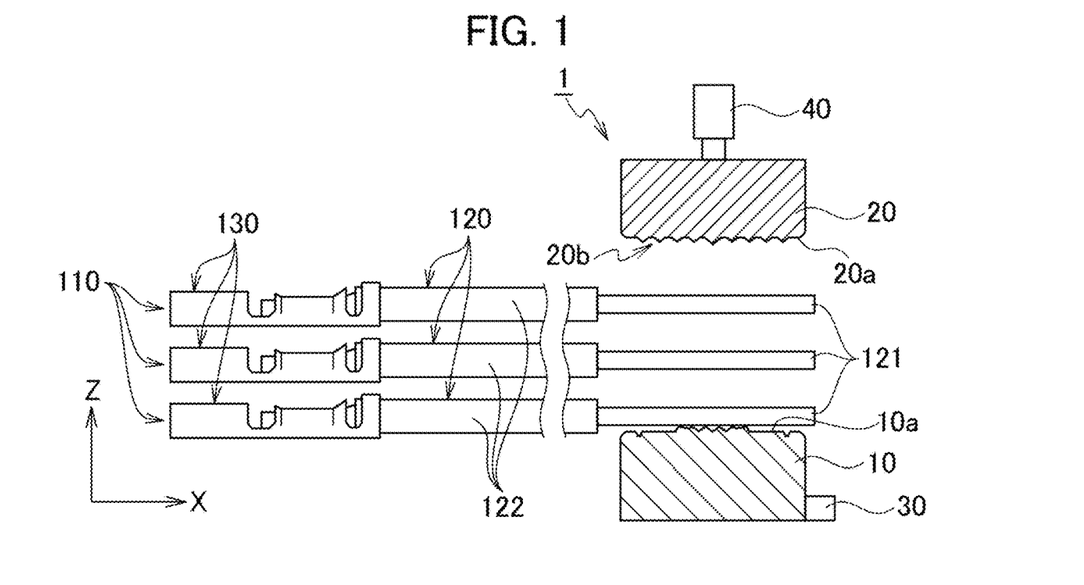
FIG. 1 is a side view of an ultrasonic joiner according to a first embodiment before a joining operation is performed.

FIG. 1 is a side view of an ultrasonic joiner 1 before a joining operation is performed, when all conductors 121 at terminals of a plurality of terminal-equipped electric wires 110 are assumed to be objects to be joined. FIG. 1 also illustrates a cross-sectional representation of a horn 10 and an anvil 20 which sandwich the plurality of conductors 121.

In the ultrasonic joiner 1, the plurality of objects to be joined are overlapped with each other. By applying ultrasonic vibration energy, while applying pressure in a direction in which the plurality of objects to be joined are close to each other, the objects to be joined are joined.

In the present embodiment, the plurality of objects to be joined are three conductors 121 exposed at terminals of the three terminal-equipped electric wires 110. The terminal-equipped electric wires 110 include electric wires 120 and terminal fittings 130. The electric wires 120 are insulated electric wires having conductors 121 and covers 122 covering the periphery of the conductors 121. The conductors 121 are core wires obtained by twisting element wires made of conductive metal materials such as copper, a copper alloy, aluminum, or an aluminum alloy, for example. The covers 122 are formed of synthetic resin materials having flexibility and electrical insulation. At the terminals of the electric wires 120, the covers 122 are removed to expose a part of the conductors 121. The terminal fittings 130 are crimped to one end of the electric wires 120 in which the conductors 121 are exposed. The terminal fittings 130 are formed by processing plates made of conductive metal materials such as copper, a copper alloy, aluminum, or an aluminum alloy, for example.

The ultrasonic joiner 1 includes the horn 10, the anvil 20, a vibrator 30, and a pressurizing device 40. The horn 10 and anvil 20 are arranged so as to be separated from each other. When the joining operation is performed, the horn 10 and the anvil 20 sandwich the conductors 121, which are the plurality of objects to be joined between end surfaces facing each other. In the present embodiment, the separation direction between the horn 10 and anvil 20 is an up and down direction, and the up and down direction corresponds to a direction along a Z direction illustrated in each drawing.

The horn 10 is a block-shaped structure located below the anvil 20. The horn 10 has a first end surface 10a that contacts the conductor 121, when the joining operation is performed. The specific shape of the horn 10 will be described in detail below.

The anvil 20 is a block-shaped structure located above the horn 10. The anvil 20 has a second end surface 20a that contacts the conductors 121, when the joining operation is performed. A direction in which the first end surface 10a of the horn 10 and the second end surface 20a of the anvil 20 face each other, is the direction along the Z direction, similar to the separation direction between the horn 10 and anvil 20. Protrusions and recesses 20b may be formed on the second end surface 20a for close contact with a part of the conductor 121.

The vibrator 30 is a driving source for vibrating the horn 10. The vibrator 30 is attached to the horn 10 in advance, and due to being vibrated by an oscillator (not illustrated), the vibrator 30 applies ultrasonic vibration to the horn 10 along a vibration direction. In the present embodiment, a vibration direction of the horn 10 is along one direction parallel to a horizontal plane, and corresponds to a direction along an X direction illustrated in each drawing.

The pressurizing device 40 is a driving source for applying a load to the anvil 20. The pressurizing device 40 presses the anvil 20 toward the horn 10 along the Z direction, while the first end surface 10a and second end surface 20a sandwich the plurality of conductors 121 during the joining operation.

Next, a specific shape of the horn 10 will be described.

Figure 2:
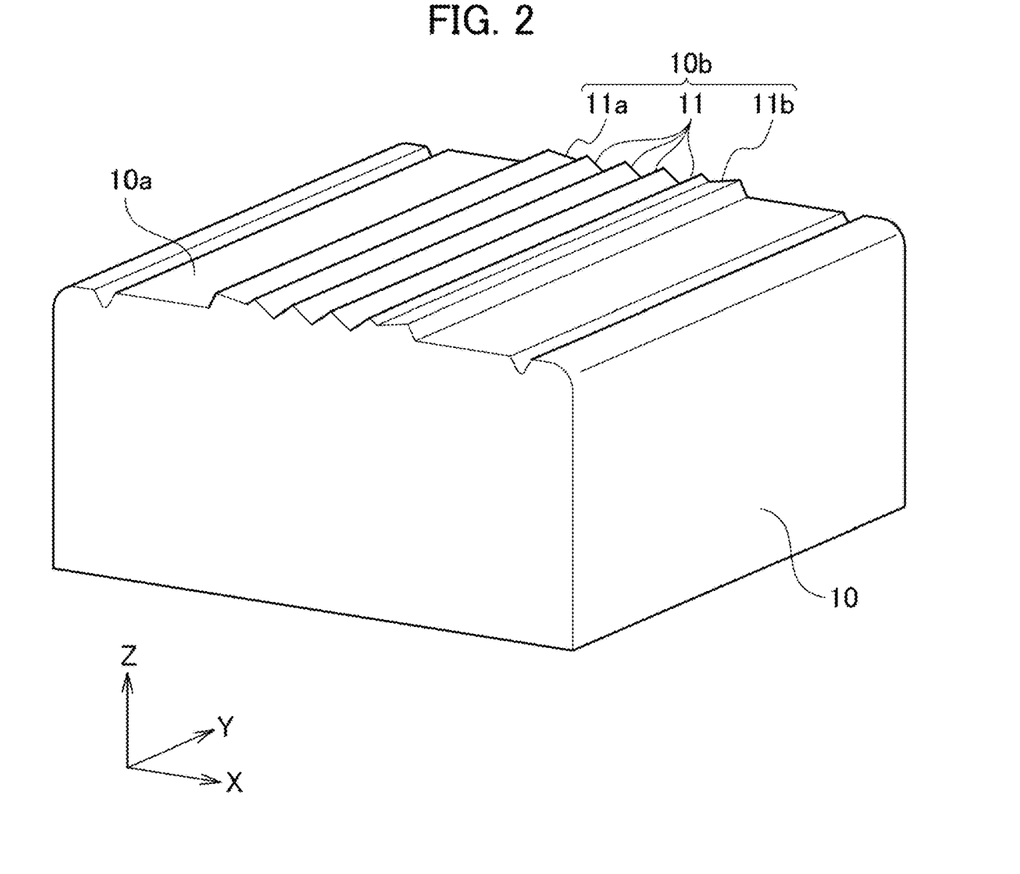
FIG. 2 is a perspective view of a horn according to the first embodiment.
Figure 3:
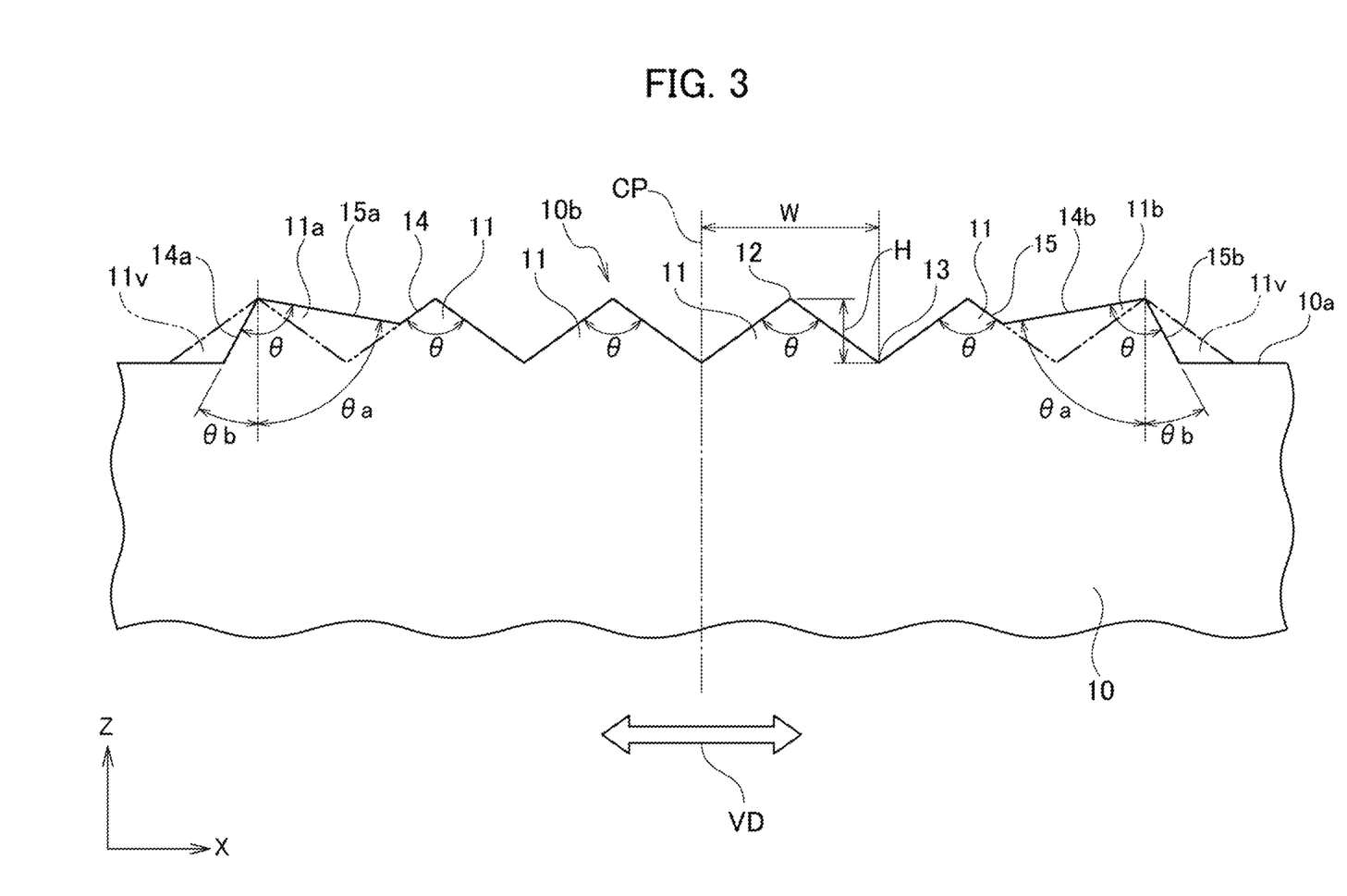
FIG. 3 is a side view of protrusions and recesses in the horn according to the first embodiment.

FIG. 2 is a perspective view of the horn 10, in which protrusions and recesses 10b formed on the first end surface 10a can be visually recognized. FIG. 3 is a side view of the protrusions and recesses 10b as viewed in a Y direction.

Hereinafter, assume that a horizontal plane perpendicular to the Z direction is an XY plane. The X direction, equivalent to a vibration direction VD (see FIG. 3) of the horn 10, is defined as a length direction of the horn 10, and the Y direction perpendicular to the length direction is defined as a width direction of the horn 10.

The horn 10 has, on the first end surface 10a thereof, knurl-shaped protrusions and recesses 10b in which a plurality of protrusions 11 extending in the width direction are continuous in the length direction. Focusing on one protrusion 11, a cross-sectional shape of the protrusion 11 obtained by cutting the protrusion 11 along a plane parallel to a hypothetical XZ plane, perpendicular to the width direction, is an isosceles triangle with a top 12 as a vertex having an angle θ. A length obtained by connecting two valleys 13 disposed on opposite sides with a protrusion therebetween in the length direction, is represented by a protrusion width W. A height from a valley 13 between two adjacent protrusions 11 to a top 12 in the up and down direction is represented by a protrusion height H.

If the angle value θ defined as the vertex angle of the top 12 is too large, there is a risk of deterioration in the efficiency for the horn 10 to transmit vibration to conductors 121 through each protrusion 11. Meanwhile, if the angle value θ is too small, each protrusion 11 may damage the conductor 121, or each protrusion 11 itself may be easily worn. Therefore, it is preferable that the angle value θ set as the value of the vertex angle of the top 12, is in a range from 60 degrees to 160 degrees. Further, it is more preferable that the angle value θ is 140 degrees.

Further, suppose that the first end surface 10a has a center plane CP which is defined as a plane that is parallel to a YZ plane, and passes through a center position in the length direction. In the above case, the plurality of protrusions 11 are arranged symmetrically with the center plane CP as a center. In the present embodiment, the number of protrusions 11 is four, as an example. In this case, a group of protrusions formed from two protrusions 11 is arranged on both one side, and the other side, symmetrically in the length direction, with the center plane CP as a center.

In the present embodiment, the number of the plurality of protrusions 11 is even, and the plurality of protrusions 11 are arranged such that one valley 13 is positioned at the center plane CP. Meanwhile, the number of the plurality of protrusions 11 may be odd, and the plurality of protrusions 11 may be arranged such that one top 12 is positioned at the center plane CP.

In addition, among the plurality of protrusions 11 included in the protrusions and recesses 10b of the horn 10, at least a pair of protrusions arranged symmetrically at both outermost ends in a direction along the vibration direction are asymmetrical surface protrusions. The asymmetrical surface protrusions in the present embodiment are a first asymmetrical surface protrusion 11a and a second asymmetrical surface protrusion 11b, which have mutually symmetrical shapes with the center plane CP as a center. A cross-sectional shape perpendicular to the width direction of an asymmetrical surface protrusion is a triangle having a top of the asymmetrical surface protrusion as a vertex.

Here, focus again on one protrusion 11 for comparison. The protrusion 11 has a first side surface 14 inclined from the top 12 to one side in the length direction, and a second side surface 15 inclined from the top 12 to the other side in the length direction. A cross-sectional shape of the protrusion 11 in the XZ plane is an isosceles triangle as described above. Therefore, an inclination angle of the first side surface 14 and an inclination angle of the second side surface 15 are the same, and each has an angle value θc (see FIG. 4B). In other words, it can be said that the protrusion 11 is a symmetrical surface protrusion having the first side surface 14 and a second side surface 15 which are mutually symmetrical with the top 12 as a center.

Meanwhile, in each of the first asymmetrical surface protrusion 11a and the second asymmetrical surface protrusion 11b, an inclination angle of a side surface inclined toward an inner side of the protrusions and recesses 10b is different from an inclination angle of a side surface inclined toward an outer side of the protrusions and recesses 10b. Hereinafter, the inclination angle of the side surface inclined toward the inner side of the protrusions and recesses 10b, is defined as an inner inclination angle. Meanwhile, the inclination angle of the side surface inclined toward the outer side of the protrusions and recesses 10b, is defined as an outer inclination angle. Here, the inner side of the protrusions and recesses 10b is a side on which the center plane CP is set. The outer side of the protrusions and recesses 10b is a side opposite to the side on which the center plane CP is set. In each of the first asymmetrical surface protrusion 11a and the second asymmetrical surface protrusion 11b, an outer inclination angle is smaller than an inner inclination angle. Further, the sum of a value of an inner inclination angle and a value of an outer inclination angle, is the same as the angle value θ of the vertex angle of the protrusion 11.

Specifically, the first asymmetrical surface protrusion 11a has a first side surface 14a which is inclined toward an outer side of the protrusions and recesses 10b, and a second side surface 15a which is inclined toward an inner side of the protrusions and recesses 10b. As illustrated in FIG. 3, assuming that hypothetical protrusions 11v having the same shape as each of the plurality of protrusions 11 are disposed continuously with the protrusions 11 at a position where the first asymmetrical surface protrusion 11a is disposed. A position of the top 12 of the first asymmetrical surface protrusion 11a is assumed to be a position of a top 12 of the hypothetical protrusions 11v. An angle value θb of an outer inclination angle of the first side surface 14a is smaller than the angle value θa of an inner inclination angle of the second side surface 15a. Further, the sum of the angle value θa and the angle value θb is the angle value θ. Further, due to the inner inclination angle being set to the angle value θa, the area of the first side surface 14 of the protrusion 11 adjacent to the first asymmetrical surface protrusion 11a, to which an end of the second side surface 15a is continuous, becomes smaller than the area of the first side surface 14 of another protrusion 11.

Similarly, the second asymmetrical surface protrusion 11b has a first side surface 14b which is inclined toward an inner side of the protrusions and recesses 10b, and a second side surface 15b which is inclined toward an outer side of the protrusions and recesses 10b. As illustrated in FIG. 3, assuming that the hypothetical protrusions 11v having the same shape as each of the plurality of protrusions 11 are disposed continuously with the protrusions 11 at a position where the second asymmetrical surface protrusion 11b is disposed, a position of the top 12 of the second asymmetrical surface protrusion 11b is also assumed to be a position of the top 12 of the hypothetical protrusion 11v. The angle value θb of an outer inclination angle of the second side surface 15b is smaller than the angle value θa of an inner inclination angle of the first side surface 14b. Further, a feature that the sum of the angle value θa and angle value θb is the angle value θ is also similar to that of the first asymmetrical surface protrusion 11a. Still further, due to the inner inclination angle of the first side surface 14b being set to the angle value θa, the area of the second side surface 15 of the protrusion 11 adjacent to the second asymmetrical surface protrusion 11b, to which an end of the first side surface 14b is continuous, becomes smaller than the area of a second side surface 15 of another protrusion 11.

That is, the first side surface 14a of the first asymmetrical surface protrusion 11a, and the second side surface 15b of the second asymmetrical surface protrusion 11b have mutually symmetrical shapes with the center plane CP as a center. Similarly, the second side surface 15a of the first asymmetrical surface protrusion 11a, and the first side surface 14b of the second asymmetrical surface protrusion 11b have mutually symmetrical shapes with the center plane CP as a center.

Next, an operation of the ultrasonic joiner 1 employing the horn 10 will be described.

Figure 4A:
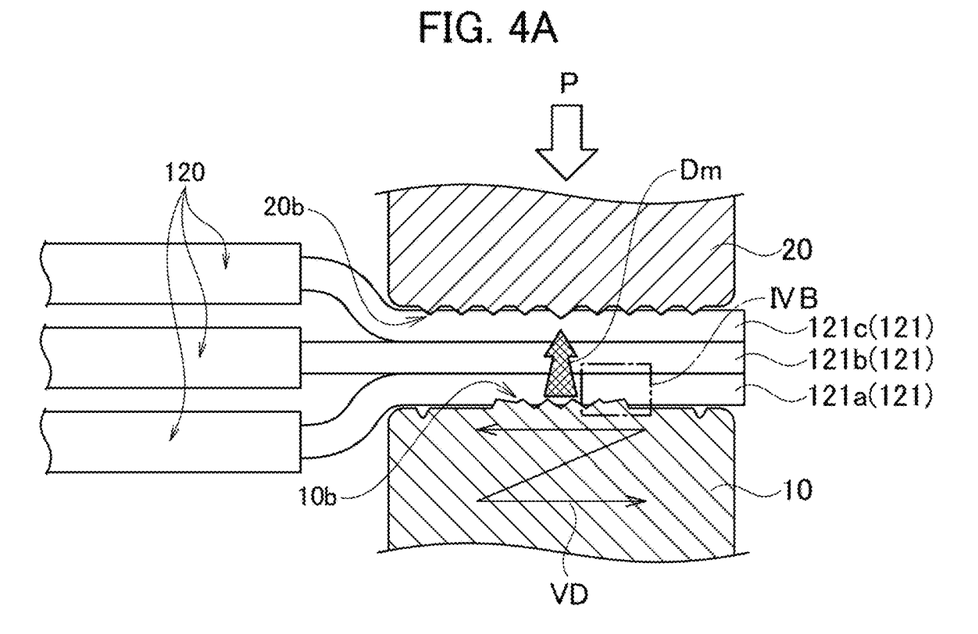
FIG. 4A is a side view of an ultrasonic joiner illustrating various states when the joining operation is performed.
Figure 4B:
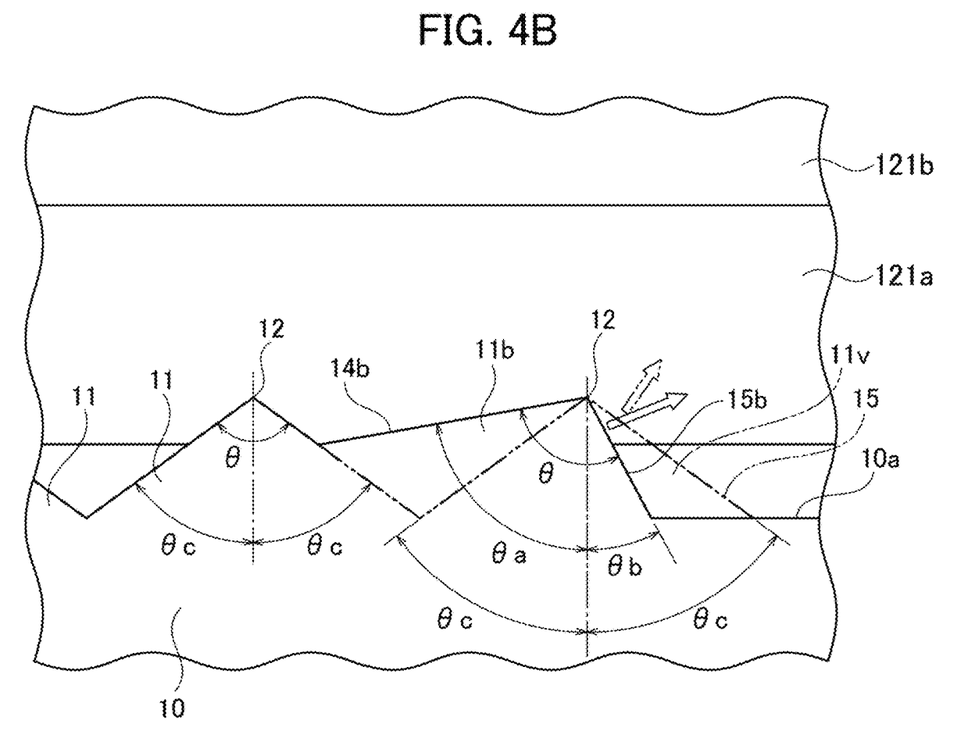
FIG. 4B is an enlarged view of the vicinity of a second asymmetrical surface protrusion, corresponding to a part IVB in FIG. 4A.

FIG. 4A is a side view of the ultrasonic joiner 1 illustrating various states when the joining operation is performed. FIG. 4B is an enlarged view of the vicinity of the second asymmetrical surface protrusion 11b, corresponding to a part IVB in FIG. 4A.

First, as illustrated in FIG. 1, as an initial state of the joining operation, it is assumed that the three conductors 121 exposed in advance are interposed between the first end surface 10a of the horn 10, and the second end surface 20a of the anvil 20. From the initial state, the ultrasonic joiner 1 regulates the width direction along the Y direction for the three conductors 121 using a separate member. As illustrated in FIG. 4A, the ultrasonic joiner 1 joins the conductors 121 to each other by applying ultrasonic vibration to the conductors with the horn 10, while applying a load P to the conductors with the anvil 20. In an example illustrated in FIG. 4A, it is assumed that the three conductors 121 are arranged along the up and down direction. Hereinafter, the conductors 121 disposed at a lowermost portion is expressed as a first conductor 121a, the conductor 121 disposed at a middle portion is expressed as a second conductor 121b, and the conductor 121 disposed at an uppermost portion is expressed as a third conductor 121c. The protrusions and recesses 10b formed on the first end surface 10a contact the first conductor 121a, and the protrusions and recesses 20b formed on the second end surface 20a contact the third conductor 121c.

During the joining operation, as indicated by a damping direction Dm in FIG. 4A, the vibration of the horn 10 propagates between the three conductors 121 while being damped, and reaches the anvil 20. Therefore, in order to suppress damping of the vibration and transmit the vibration to the conductors 121 more efficiently, the horn 10 has the protrusions and recesses 10b, and a part thereof digs into the first conductor 121a.

As a comparative example, it is assumed that the protrusions and recesses 10b of the horn 10 have the hypothetical protrusion 11v having the same shape as another protrusion 11, in place of the first asymmetrical surface protrusion 11a and second asymmetrical surface protrusion 11b. In FIG. 4B, as an example, the hypothetical protrusion 11v in place of the second asymmetrical surface protrusion 11b is drawn with a two-dot chain line. With reference to FIG. 4B, an angle value of an inclination angle of the second side surface 15 of the hypothetical protrusion 11v, is the same as an angle value θc of an inclination angle of a second side surface 15 of the other protrusion 11. When the horn 10 vibrates, and the hypothetical protrusion 11v digs into the first conductor 121a, the reaction force applied to the first conductor 121a is directed relatively upward and toward an outer side of the protrusions and recesses 10b, as indicated by a two-dot chain line arrow in FIG. 4B.

Meanwhile, in the present embodiment, the protrusions and recesses 10b of the horn 10 have the first asymmetrical surface protrusion 11a and second asymmetrical surface protrusion 11b. Focusing on the second asymmetrical surface protrusion 11b for reference to FIG. 4B, as described above, the angle value θb of the outer inclination angle of the second side surface 15b is smaller than the angle value θa of the inner inclination angle of the first side surface 14b. Further, the sum of the angle value θa and angle value θb is an angle value θ of a vertex angle of a protrusion 11. That is, the angle value θb of the outer inclination angle of the second side surface 15b is smaller than the angle value θc of an inclination angle of a second side surface 15 of a protrusion 11. Therefore, as illustrated in FIG. 4B, when the second asymmetrical surface protrusion 11b digs into the first conductor 121a, the reaction force applied to the first conductor 121a is directed toward an outer side of the protrusions and recesses 10b, as indicated by a white arrow. However, the reaction force applied by the second asymmetrical surface protrusion 11b is directed closer to a horizontal direction than that of the hypothetical protrusion 11v. Therefore, a vibration direction component of the reaction force, when the second asymmetrical surface protrusion 11b is present, is larger than that when the hypothetical protrusion 11v is present. Therefore, the vibration of the horn 10 is transmitted over a wider range between the three conductors 121.

In the first asymmetrical surface protrusion 11a also, due to the outer inclination angle of the first side surface 14a being set to the angle value θb, the vibration of the horn 10 is transmitted over a wider range between the three conductors 121.

Meanwhile, if the vertex angles of the first asymmetrical surface protrusion 11a and the second asymmetrical surface protrusion 11b are set to be too small, it is conceivable that the first conductor 121a contacted by the protrusions may be easily cut, or each asymmetrical surface protrusion itself may be easily worn, and this is not desirable. Therefore, in the present embodiment, an outer inclination angle is set to have the angle value θb which is smaller than the angle value θc, while an inner inclination angle is set to have the angle value θa, which is larger than the angle value θc. By setting an inclination angle of each side surface in this way, it is possible to prevent the vertex angles of the first asymmetrical surface protrusion 11a and second asymmetrical surface protrusion 11b from being excessively small.

Next, effects of the horn 10 and the ultrasonic joiner 1 employing the horn 10 will be described.

The horn 10 applies ultrasonic vibration to a plurality of objects to be joined which are the conductors 121 sandwiched between the anvil 20 and horn 10, to join the plurality of objects to be joined to each other, for example. The horn 10 has, on a first end surface 10a in contact with an object to be joined, knurl-shaped protrusions and recesses 10b formed of a plurality of protrusions 11 extending in the width direction perpendicular to the vibration direction of the horn 10. Among the plurality of protrusions 11, at least a pair of protrusions arranged symmetrically at both outermost ends in a direction along the vibration direction are asymmetrical surface protrusions. A cross-sectional shape perpendicular to a width direction of an asymmetrical surface protrusion is a triangle having a top of the asymmetrical surface protrusion as a vertex. Among two side surfaces of an asymmetrical surface protrusion, an inclination angle of one side surface inclined toward an outer side of the protrusions and recesses 10b is defined as an outer inclination angle, and an inclination angle of the other side surface inclined toward an inner side of the protrusions and recesses 10b is defined as an inner inclination angle. At this time, the angle value θb of the outer inclination angle is smaller than the angle value θa of the inner inclination angle.

Further, the ultrasonic joiner 1 joins the plurality of objects to be joined to each other by applying ultrasonic vibration from a horn to the plurality of objects to be joined sandwiched between the horn and the anvil 20. Here, the horn is the horn 10 described above.

The vibration direction of the horn 10 corresponds to a direction along the X direction in the above example. The width direction of the horn 10 corresponds to a direction along the Y direction in the above example. The pair of asymmetrical surface protrusions correspond to the first asymmetrical surface protrusion 11a and the second asymmetrical surface protrusion 11b in the above example. In the first asymmetrical surface protrusion 11a, a side surface of which an outer inclination angle is defined is the first side surface 14a, and a side surface of which an inner inclination angle is defined is the second side surface 15a. In the second asymmetrical surface protrusion 11b, a side surface of which an outer inclination angle is defined is the second side surface 15b, and a side surface of which an inner inclination angle is defined is the first side surface 14b.

The horn 10 has the knurl-shaped protrusions and recesses 10b on the first end surface 10a in contact with an object to be joined. Among the plurality of protrusions 11 constituting the protrusions and recesses 10b, at least a pair of protrusions arranged symmetrically at both outermost ends in a direction along the vibration direction are asymmetrical surface protrusions, which are set such that the angle value θa of an inner inclination angle and the angel value θb of an outer inclination angle satisfy the above conditions. Therefore, according to the horn 10 with the protrusions and recesses 10b having the asymmetrical surface protrusions as described above, a vibration direction component of the reaction force applied to an object to be joined can be made larger than that of the horn of the comparative example with the protrusions and recesses 10b not having asymmetrical surface protrusions. Therefore, the vibration of the horn 10 can be transmitted over a wider range between the plurality of objects to be joined.

In general, when the number of objects to be joined is large, it is assumed that the damping of the vibration of a horn becomes large, and the joining between objects to be joined becomes weak. Meanwhile, according to the ultrasonic joining using the horn 10 according to the present embodiment, the vibration of the horn 10 can be efficiently propagated to an object to be joined, and this is advantageous even when the number of objects to be joined is large.

As described above, according to the present embodiment, it is possible to provide the horn 10 and ultrasonic joiner 1 which are advantageous for suppressing damping of ultrasonic vibration propagating a plurality of objects to be joined.

Further, in the horn 10, a cross-sectional shape perpendicular to a width direction of a protrusion 11 which is not an asymmetrical surface protrusion, among the plurality of protrusions 11, may be an isosceles triangle having the top 12 of the protrusion 11 as a vertex.

According to the horn 10, a cross-sectional shape perpendicular to the width direction of the protrusion 11 which is not an asymmetrical surface protrusion, among the plurality of protrusions 11, is a simple shape. Therefore, the shape can be set in accordance with a shape of a protrusion disposed in a conventional horn.

Further, in the horn 10, the sum of the angle value θb of an outer inclination angle and the angle value θa of an inner inclination angle may be the same as the angle value θ of a vertex angle of the protrusion 11, which is not an asymmetrical surface protrusion.

According to the horn 10, an outer inclination angle is set to have a relatively small angle value θb, while an inner inclination angle is set to have a relatively large angle value θa. Therefore, a vertex angle of an asymmetrical surface protrusion can be suppressed from being excessively small. This can avoid in advance that an object to be joined to which the protrusions and recesses 10b contact is damaged due to the shape of an asymmetrical surface protrusion, or that an asymmetrical surface protrusion itself is easily worn.

Further, the angle value θ set as a vertex angle of the protrusion 11 of the horn 10 may be in a range from 60 degrees to 160 degrees. More desirably, the angle value θ set as a vertex angle of the protrusion 11 may be 140 degrees.

As described above, if the angle value θ is too large, there is a risk of deterioration in the efficiency for the horn 10 to transmit vibration to the conductors 121 through each protrusion 11. Meanwhile, if the angle value θ is too small, there is a risk that each protrusion 11 damages an object to be joined. Meanwhile, according to the horn 10, these undesirable issues can be avoided in advance by setting the angle value θ within the above range, or at a specific value.

Second Embodiment

Figure 5:
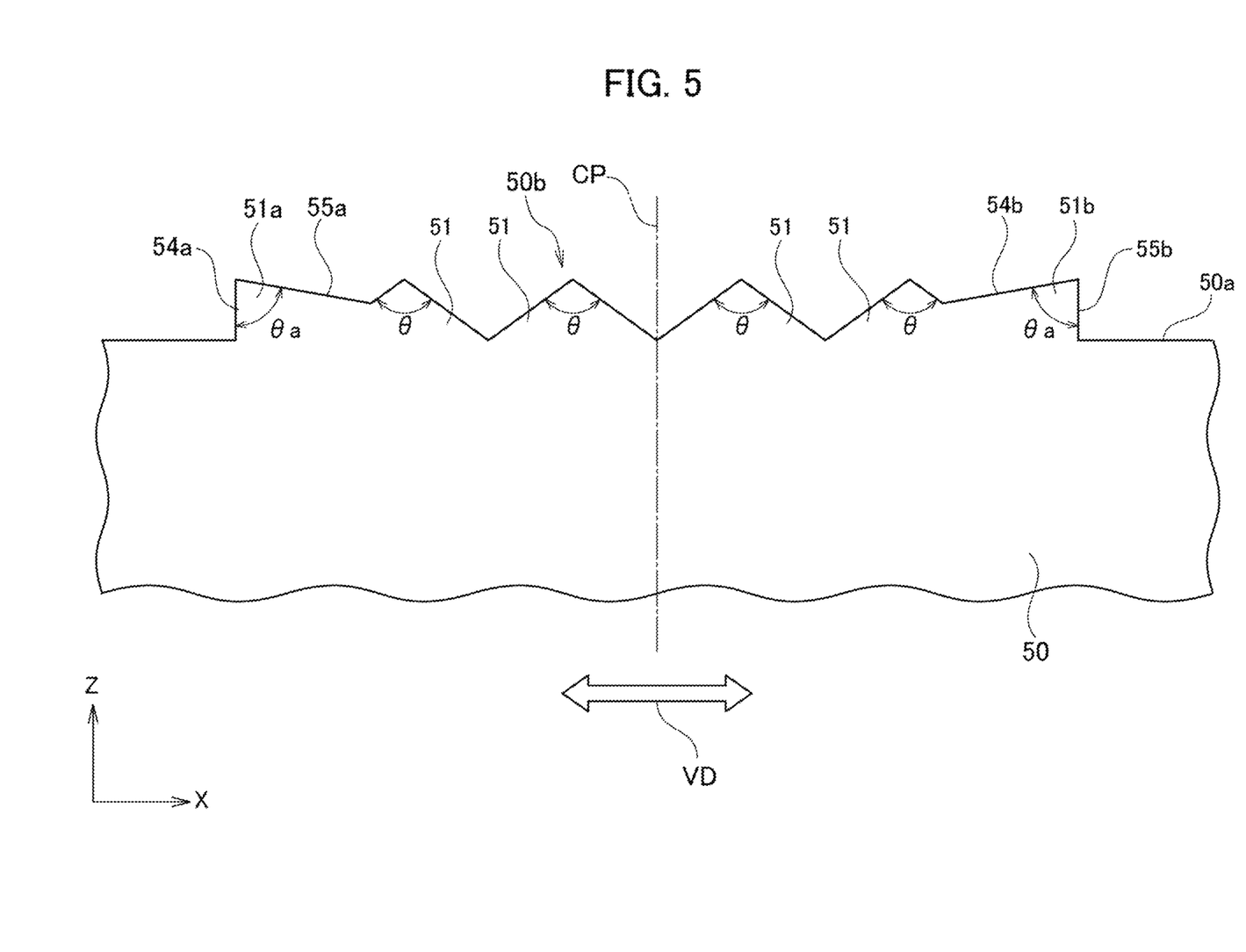
FIG. 5 is a side view of protrusions and recesses in a horn according to a second embodiment.

FIG. 5 is a side view of protrusions and recesses 50b of a horn 50 according to a second embodiment as viewed in the Y direction.

First, similar to the horn 10 according to the first embodiment, the horn 50 applies ultrasonic vibration to a plurality of objects to be joined sandwiched between the horn and the anvil 20, to join the plurality of objects to be joined to each other. Meanwhile, instead of the protrusions and recesses 10b formed in the horn 10, the horn 50 has, on a first end surface 50a in contact with an object to be joined, the knurl-shaped protrusions and recesses 50b formed of a plurality of protrusions 51 extending in a width direction perpendicular to a vibration direction of the horn 50. Among the plurality of protrusions 51, at least a pair of protrusions arranged symmetrically at both outermost ends in a direction along the vibration direction are asymmetrical surface protrusions. A cross-sectional shape perpendicular to a width direction of an asymmetrical surface protrusion is a triangle having a top of the asymmetrical surface protrusion as a vertex. Among two side surfaces of the asymmetrical surface protrusion, an inclination angle of one side surface inclined toward an outer side of the protrusions and recesses 50b is defined as an outer inclination angle, and an inclination angle of the other side surface inclined toward an inner side of the protrusions and recesses 50b is defined as an inner inclination angle. At this time, the angle value θb of the outer inclination angle is smaller than the angle value θa of the inner inclination angle.

The vibration direction of the horn 50 corresponds to a direction along the X direction in the above example. The width direction of the horn 50 corresponds to a direction along the Y direction in the above example. The pair of asymmetrical surface protrusions correspond to a first asymmetrical surface protrusion 51a and a second asymmetrical surface protrusion 51b in the above example. In the first asymmetrical surface protrusion 51a, a side surface of which an outer inclination angle is defined is a first side surface 54a, and a side surface of which an inner inclination angle is defined is a second side surface 55a. In the second asymmetrical surface protrusion 51b, a side surface of which an outer inclination angle is defined is a second side surface 55b, and a side surface of which an inner inclination angle is defined is a first side surface 54b.

Further, the ultrasonic joiner 1 joins the plurality of objects to be joined to each other by applying ultrasonic vibration from a horn to the plurality of objects to be joined sandwiched between the horn and the anvil 20. Here, the horn is the horn 50 described above.

That is, the horn 50 and the ultrasonic joiner 1 including the horn 50 can achieve the same effect as in the first embodiment.

In addition, the first side surface 54a of the first asymmetrical surface protrusion 51a of the horn 50 toward an outer side of the protrusions and recesses 50b may be perpendicular with respect to the first end surface 50a. Similarly, the second side surface 55b of the second asymmetrical surface protrusion 51b toward an outer side of the protrusions and recesses 50b may be perpendicular with respect to the first end surface 50a.

According to the horn 50, since a vertex angle of each of the first asymmetrical surface protrusion 51a and second asymmetrical surface protrusion 51b is defined only by an inner inclination angle, the shape of a vertex is sharper than that in the first embodiment. Therefore, an asymmetrical surface protrusion is more likely to be caught on an object to be joined. This is advantageous when desiring to increase a vibration direction component of the reaction force applied to an object to be joined. An angle value of the inner inclination angle may be the same as the angle value θa of the inner inclination angle in the first embodiment, for example.

Third Embodiment

Figure 6:
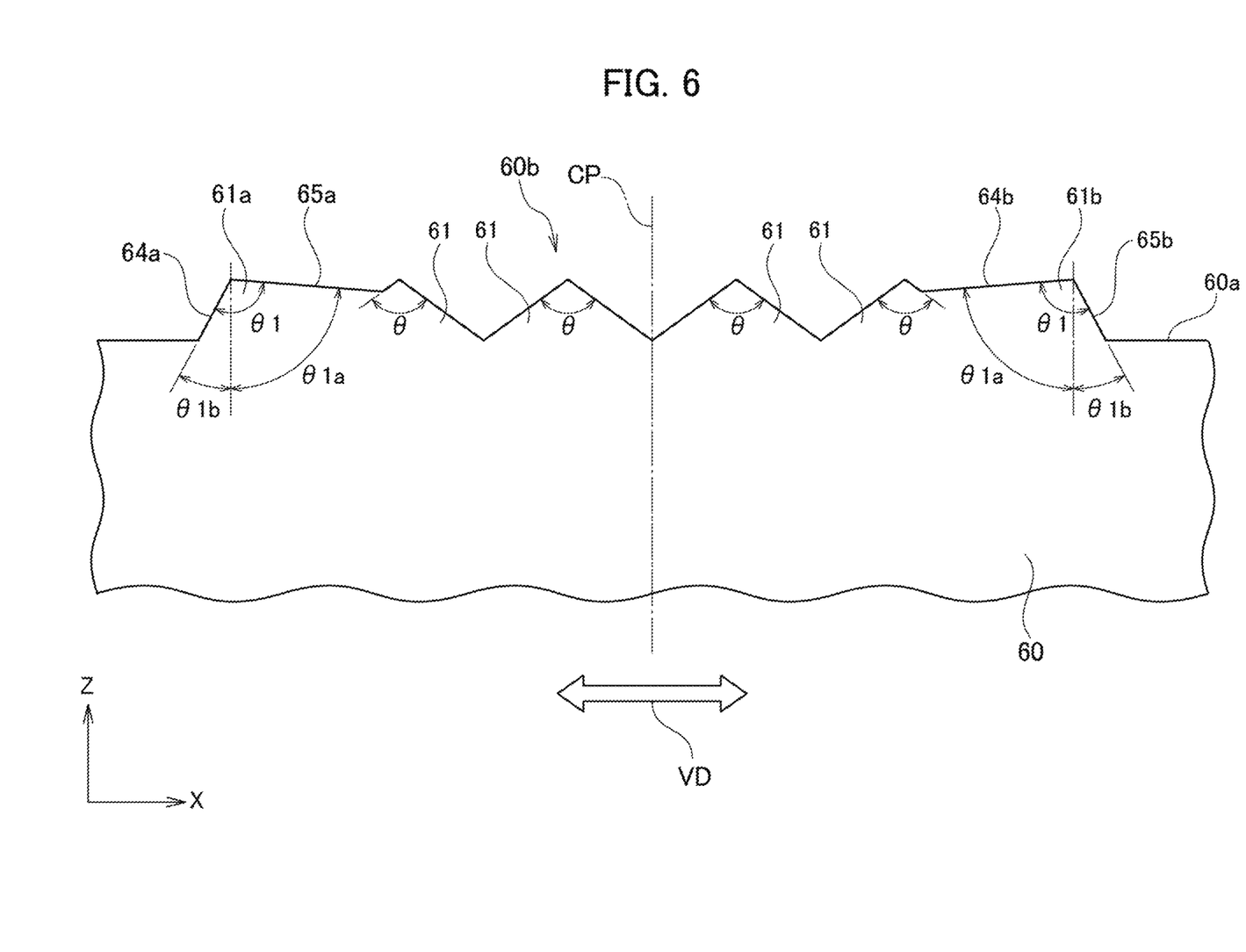
FIG. 6 is a side view of protrusions and recesses in a horn according to a third embodiment.

FIG. 6 is a side view of protrusions and recesses 60b of a horn 60 according to a third embodiment as viewed in the Y direction.

First, similar to the horn 10 according to the first embodiment, the horn 60 applies ultrasonic vibration to a plurality of objects to be joined sandwiched between the horn and the anvil 20, to join the plurality of objects to be joined to each other. Meanwhile, instead of the protrusions and recesses 10b formed in the horn 10, the horn 60 has, on a first end surface 60a in contact with an object to be joined, the knurl-shaped protrusions and recesses 60b formed of a plurality of protrusions 61 extending in a width direction perpendicular to a vibration direction of the horn 60. Among the plurality of protrusions 61, at least a pair of protrusions arranged symmetrically at both outermost ends in a direction along the vibration direction are asymmetrical surface protrusions. A cross-sectional shape perpendicular to a width direction of an asymmetrical surface protrusion is a triangle having a top of the asymmetrical surface protrusion as a vertex. Among two side surfaces of the asymmetrical surface protrusion, an inclination angle of one side surface inclined toward an outer side of the protrusions and recesses 60b is defined as an outer inclination angle, and an inclination angle of the other side surface inclined toward an inner side of the protrusions and recesses 60b is defined as an inner inclination angle. At this time, an angle value θ1b of the outer inclination angle is smaller than an angle value θ1a of the inner inclination angle.

The vibration direction of the horn 60 corresponds to a direction along the X direction in the above example. The width direction of the horn 60 corresponds to a direction along the Y direction in the above example. The pair of asymmetrical surface protrusions correspond to the first asymmetrical surface protrusion 61a and the second asymmetrical surface protrusion 61b in the above example. In the first asymmetrical surface protrusion 61a, a side surface of which an outer inclination angle is defined is a first side surface 64a, and a side surface of which an inner inclination angle is defined is a second side surface 65a. In the second asymmetrical surface protrusion 61b, a side surface of which an outer inclination angle is defined is a second side surface 65b, and a side surface of which an inner inclination angle is defined is a first side surface 64b.

Further, the ultrasonic joiner 1 joins the plurality of objects to be joined to each other by applying ultrasonic vibration from a horn to the plurality of objects to be joined sandwiched between the horn and the anvil 20. Here, the horn is the horn 60 described above.

That is, the horn 60 and the ultrasonic joiner 1 including the horn 60 achieve the same effect as in the first embodiment.

Further, in the horn 60, the sum θ1 of the angle value θ1b of an outer inclination angle and the angle value θ1a of an inner inclination angle, may be larger than an angle value θ of a vertex angle of a protrusion 61 which is not an asymmetrical surface protrusion.

A vertex angle of an asymmetrical surface protrusion of the horn 60 is set to be larger than that of the horn 10 of the first embodiment. Therefore, this is advantageous when priority is given to avoidance of issues in which an object to be joined in contact with an asymmetrical surface protrusion is damaged, or an asymmetrical surface protrusion itself is worn, for example.

Fourth Embodiment

Figure 7:
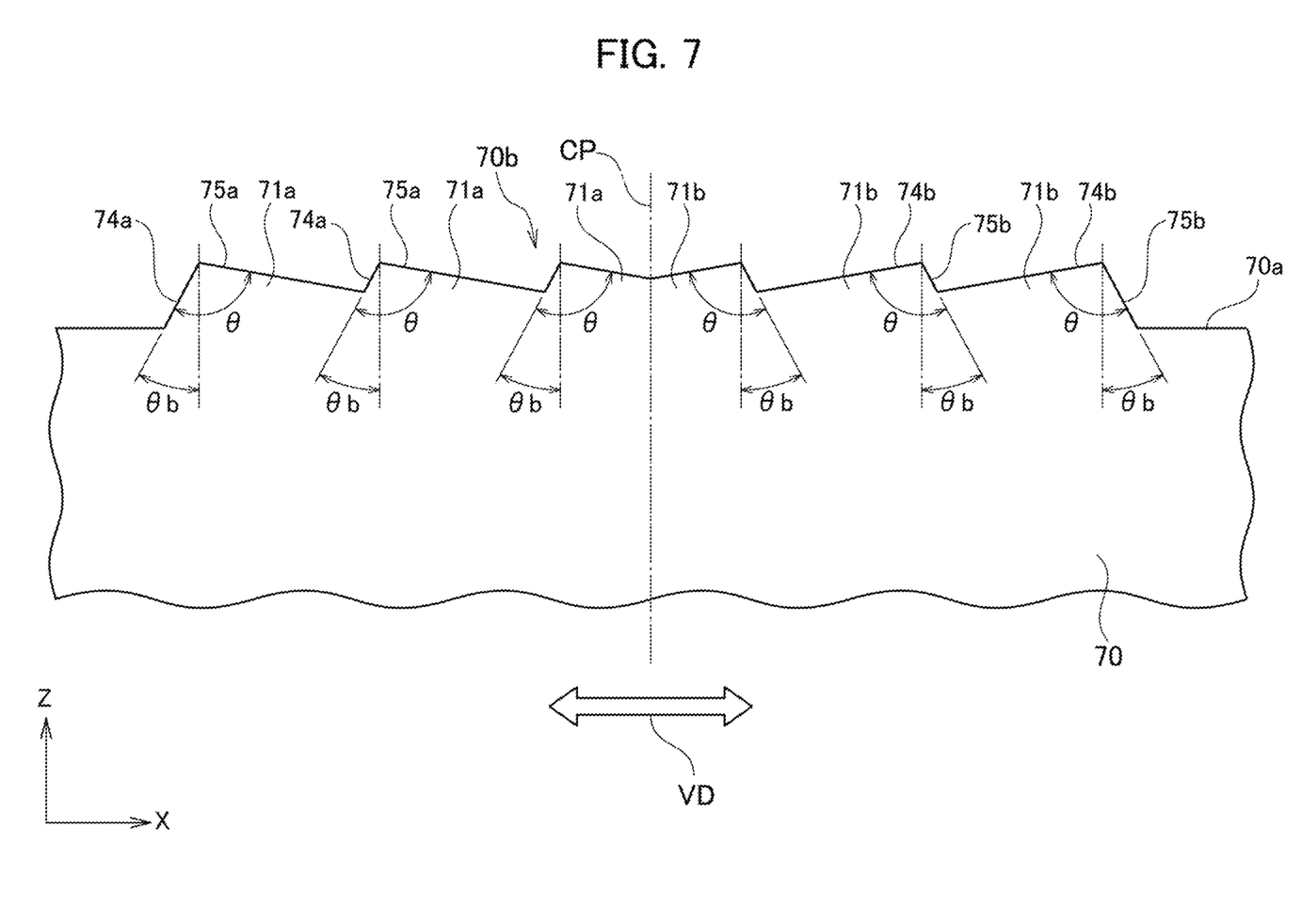
FIG. 7 is a side view of protrusions and recesses in a horn according to a fourth embodiment.

FIG. 7 is a side view of protrusions and recesses 70b of a horn 70 according to a fourth embodiment as viewed in the Y direction.

Similar to the horn 10 according to the first embodiment, the horn 70 applies ultrasonic vibration to a plurality of objects to be joined sandwiched between the horn and the anvil 20, to join the plurality of objects to be joined to each other. Meanwhile, instead of the protrusions and recesses 10b formed in the horn 10, the horn 70 has, on a first end surface 70a in contact with an object to be joined, the knurl-shaped protrusions and recesses 70b formed of a plurality of protrusions extending in a width direction perpendicular to a vibration direction of the horn 70. Among the plurality of protrusions, at least a pair of protrusions arranged symmetrically at both outermost ends in a direction along the vibration direction are asymmetrical surface protrusions. A cross-sectional shape perpendicular to a width direction of an asymmetrical surface protrusion is a triangle having a top of the asymmetrical surface protrusion as a vertex. Among two side surfaces of the asymmetrical surface protrusion, an inclination angle of one side surface inclined toward an outer side of the protrusions and recesses 70b is defined as an outer inclination angle, and an inclination angle of the other side surface inclined toward an inner side of the protrusions and recesses 70b is defined as an inner inclination angle. At this time, the angle value θb of the outer inclination angle is smaller than the angle value θa of the inner inclination angle.

The vibration direction of the horn 70 corresponds to a direction along the X direction in the above example. The width direction of the horn 70 corresponds to a direction along the Y direction in the above example. The pair of asymmetrical surface protrusions correspond to the first asymmetrical surface protrusion 71a and the second asymmetrical surface protrusion 71b in the above example. In the first asymmetrical surface protrusion 71a, a side surface of which an outer inclination angle is defined is a first side surface 74a, and a side surface of which an inner inclination angle is defined is a second side surface 75a. In the second asymmetrical surface protrusion 71b, a side surface of which an outer inclination angle is defined is a second side surface 75b, and a side surface of which an inner inclination angle is defined is a first side surface 74b.

Further, the ultrasonic joiner 1 joins the plurality of objects to be joined to each other by applying ultrasonic vibration from a horn to the plurality of objects to be joined sandwiched between the horn and the anvil 20. Here, the horn is the horn 70 described above.

That is, the horn 70 and the ultrasonic joiner 1 including the horn 70 achieve the same effect as in the first embodiment.

According to the definition of the horn 70, it is sufficient if, among the plurality of protrusions, at least a pair of protrusions arranged symmetrically at both outermost ends in a direction along the vibration direction are asymmetrical surface protrusions. That is, as illustrated in FIG. 7, all of the plurality of protrusions may be asymmetrical surface protrusions. In this case, with the center plane CP as a center, all of protrusions 11 on one side in the length direction are first asymmetrical surface protrusions 71a, and all of protrusions 11 on the other side in the length direction are second asymmetrical surface protrusions 71b. Each of the first asymmetrical surface protrusions 71a and each of the second asymmetrical surface protrusions 71b have mutually symmetrical shapes with the center plane CP as a center.

The horn 70 has a larger number of asymmetrical surface protrusions in which an outer inclination angle is set to have a relatively small angle value θb, than those of the horn 10 of the first embodiment. Therefore, this is advantageous when desiring to transmit vibration of the horn 70 over a wider range between the plurality of objects to be joined, for example.

In each of the above embodiments, a case has been exemplified in which all of the plurality of objects to be joined are the conductors 121 as the core wires of the electric wires 120. However, at least one of the plurality of objects to be joined may be a plate such as a metal plate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A horn that applies ultrasonic vibration to a plurality of objects to be joined sandwiched between an anvil and the horn, to join the objects to be joined to each other, the horn comprising:
   knurl-shaped protrusions and recesses that are formed of a plurality of protrusions each extending in a width direction perpendicular to a vibration direction of the horn, and that are formed on an end surface in contact with one of the objects to be joined, wherein
   among the plurality of protrusions, at least a pair of protrusions arranged symmetrically at both outermost ends in a direction along the vibration direction are asymmetrical surface protrusions,
   a cross-sectional shape perpendicular to a width direction of each of the asymmetrical surface protrusions is a triangle having a top of each of the asymmetrical surface protrusions as a vertex, among two side surfaces of each of the asymmetrical surface protrusions, an inclination angle of one of the two side surfaces inclined toward an outer side of the protrusions and recesses is defined as an outer inclination angle, and an inclination angle of the other of the two side surfaces inclined toward an inner side of the protrusions and recesses is defined as an inner inclination angle, an angle value of the outer inclination angle is smaller than an angle value of the inner inclination angle, and an area of a first side surface of a first protrusion among the plurality of protrusions is smaller than an area of a second side surface of the first protrusion, wherein the first protrusion is adjacent to one of the asymmetrical surface protrusions, the first side surface faces towards the one of the asymmetrical surface protrusions, and the second side surface is opposite to the first side surface.

2. The horn according to claim 1, wherein
a cross-sectional shape perpendicular to a width direction of at least one protrusion from among the first protrusion and a second protrusion that is not the asymmetrical surface protrusions, among the plurality of protrusions, is an isosceles triangle having a top of the protrusion as a vertex.

3. The horn according to claim 2, wherein
a sum of the angle value of the outer inclination angle and the angle value of the inner inclination angle is the same as an angle value of a vertex angle of the at least one protrusion that is not the asymmetrical surface protrusions.

4. The horn according to claim 2, wherein
a sum of the angle value of the outer inclination angle and the angle value of the inner inclination angle is larger than an angle value of a vertex angle of the at least one protrusion that is not the asymmetrical surface protrusions.

5. The horn according to claim 3, wherein
the angle value set as the vertex angle of the at least one protrusion is in a range from 60 degrees to 160 degrees.

6. The horn according to claim 5, wherein
the angle value set as the vertex angle of the at least one protrusion is 140 degrees.

7. The horn according to claim 1, wherein
one of the side surfaces of each of the asymmetrical surface protrusions toward an outer side of the protrusions and recesses is perpendicular with respect to the end surface.

8. An ultrasonic joiner that applies ultrasonic vibration to a plurality of objects to be joined sandwiched between a horn and an anvil from the horn, to join the plurality of objects to be joined to each other, wherein
the horn is the horn according to claim 1.

9. The horn according to claim 1, wherein one of the side surfaces of each of the asymmetrical surface protrusions toward an outer side of the protrusions and recesses is non-perpendicular with respect to the end surface.

10. A horn that applies ultrasonic vibration to a plurality of objects to be joined sandwiched between an anvil and the horn, to join the objects to be joined to each other, the horn comprising:

knurl-shaped protrusions and recesses that are formed of a plurality of protrusions each extending in a width direction perpendicular to a vibration direction of the horn, and that are formed on an end surface in contact with one of the objects to be joined, wherein among the plurality of protrusions, at least a pair of protrusions arranged symmetrically at both outermost ends in a direction along the vibration direction are asymmetrical surface protrusions, a cross-sectional shape perpendicular to a width direction of each of the asymmetrical surface protrusions is a triangle having a top of each of the asymmetrical surface protrusions as a vertex, among two side surfaces of each of the asymmetrical surface protrusions, an inclination angle of one of the two side surfaces inclined toward an outer side of the protrusions and recesses is defined as an outer inclination angle, and an inclination angle of the other of the two side surfaces inclined toward an inner side of the protrusions and recesses is defined as an inner inclination angle, an angle value of the outer inclination angle is smaller than an angle value of the inner inclination angle, a cross-sectional shape perpendicular to a width direction of a protrusion that is not the asymmetrical surface protrusions, among the plurality of protrusions, is an isosceles triangle having a top of the protrusion as a vertex, a sum of the angle value of the outer inclination angle and the angle value of the inner inclination angle is the same as an angle value of a vertex angle of the protrusion that is not the asymmetrical surface protrusions, and the angle value set as the vertex angle of the protrusion is 140 degrees.

* * * * *